(12) United States Patent
Ge et al.

(10) Patent No.: US 9,605,413 B2
(45) Date of Patent: Mar. 28, 2017

(54) PRODUCTIVITY MANAGEMENT SYSTEM FOR A MACHINE

(71) Applicant: Caterpillar Inc., Peoria, IL (US)

(72) Inventors: Xinyu Ge, Peoria, IL (US); Qiang Chen, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/725,502

(22) Filed: May 29, 2015

(65) Prior Publication Data

US 2016/0347321 A1 Dec. 1, 2016

(51) Int. Cl.
| | |
|---|---|
| *E02F 9/20* | (2006.01) |
| *B60W 10/06* | (2006.01) |
| *E02F 9/22* | (2006.01) |
| *B60W 30/188* | (2012.01) |
| *B60W 10/101* | (2012.01) |
| *B60W 10/30* | (2006.01) |

(52) U.S. Cl.
CPC ........... *E02F 9/2246* (2013.01); *B60W 10/06* (2013.01); *B60W 10/101* (2013.01); *B60W 10/30* (2013.01); *B60W 30/1886* (2013.01); *E02F 9/2025* (2013.01); *B60W 2710/0666* (2013.01); *B60W 2710/1038* (2013.01); *B60W 2710/305* (2013.01); *E02F 9/2062* (2013.01)

(58) Field of Classification Search
CPC . E02F 9/2025; B60W 30/1886; B60W 10/06; B60W 10/30; B60W 10/101; B60W 2710/305; B60W 2710/1038; B60W 710/0666

USPC .......................................................... 701/50
See application file for complete search history.

(56) References Cited

U.S. PATENT DOCUMENTS

| | | | | |
|---|---|---|---|---|
| 5,188,502 A | * | 2/1993 | Tonsor | E02F 3/433 414/699 |
| 6,061,617 A | * | 5/2000 | Berger | A01B 63/10 700/18 |
| 6,234,254 B1 | * | 5/2001 | Dietz | A01B 67/00 172/3 |
| 6,542,789 B2 | * | 4/2003 | Ufheil | G05B 19/04 700/275 |
| 7,533,527 B2 | | 5/2009 | Naruse | |
| 7,539,570 B2 | * | 5/2009 | Normann | E02F 9/26 37/414 |
| 7,664,586 B2 | | 2/2010 | Ozawa et al. | |
| 8,374,755 B2 | | 2/2013 | Lin et al. | |
| 8,473,170 B2 | | 6/2013 | Stoller et al. | |
| 2002/0073699 A1 | * | 6/2002 | Nishimura | B66C 13/18 60/325 |
| 2006/0161324 A1 | * | 7/2006 | Ozawa | E02F 9/2235 701/50 |

(Continued)

*Primary Examiner* — Tyler J Lee
(74) *Attorney, Agent, or Firm* — Baker Hostetler; James S. Bennin

(57) ABSTRACT

A multi-tool machine for utilizing a plurality of work tools includes an engine and a controller operatively coupled to the engine. The engine is configured to operate at a first engine operating configuration when a first work tool is coupled to the machine and configured to operate at a second engine operating configuration when a second work tool is coupled to the machine. The controller is configured to transition the engine from the first configuration to the second configuration when the machine transitions from the first work tool to the second work tool.

20 Claims, 5 Drawing Sheets

(56) References Cited

U.S. PATENT DOCUMENTS

| | | | |
|---|---|---|---|
| 2008/0202468 A1* | 8/2008 | Grill | E02F 9/2235 |
| | | | 123/339.14 |
| 2009/0240406 A1* | 9/2009 | Fukushima | B60W 10/06 |
| | | | 701/54 |
| 2012/0029775 A1* | 2/2012 | Peters | B23K 9/1006 |
| | | | 701/50 |
| 2012/0310495 A1 | 12/2012 | Nakanishi et al. | |
| 2013/0041561 A1 | 2/2013 | Asami et al. | |
| 2013/0325293 A1 | 12/2013 | Jacobson | |

* cited by examiner

PRODUCTIVITY MANAGEMENT SYSTEM FOR A MACHINE

TECHNICAL FIELD

This disclosure relates generally to multi-tool machines, and more particularly, to a system and method for controlling a work cycle of the multi-tool machine when tools are interchanged.

BACKGROUND

Modern work machines are used to perform many different applications in the areas of construction, agriculture, landscaping, and mining. To perform these applications, multiple types of work tools are generally mounted to work machine lift arms or other articulated members, and may connect to one or more of the work machine's hydraulic mechanisms. A work machine operator may drive the work machine, and control any work tool attached thereto, through the use of various operator interfaces.

Each work tool that is interchanged with the work machine may operate most efficiently at a different power level. For instance, the power demand for a machine using a bucket to dig a trench may be completely different than the power demand for a machine using a grader to level a slope. The operator has to alter the work machine operation in response to a change in work tools. This results in the performance and efficiency of the work machine being dependent on the experience level of the operator.

Current systems may be configured to alter work machine operation based on a change in work tools include changing machine parameters related to hydraulic mechanisms. U.S. Pat. No. 7,539,570 describes a method for sensing an operational characteristic indicative of a work tool application. Based on the operational characteristic, the work machine is altered by changing parameters such as hydraulic cylinder pressure, cylinder position, and hydraulic fluid flow. Although this method may recognize different work tools, the control of the power generation of the work machine is not altered.

SUMMARY

An aspect of the present disclosure provides a machine configured to utilize a plurality of work tools. The machine includes an engine and a controller operatively coupled thereto. The engine is configured to operate at a plurality of engine speeds. The engine has a first configuration in which the engine produces a first output when the engine operates at one of the plurality of engine speeds, and the engine further has a second configuration in which the engine produces a second output when the engine operates at the one of plurality of engine speeds. The first output is different from the second output. The controller is configured to transition the engine from the first configuration to the second configuration when the machine transitions from a first of the plurality of work tools to a second of the plurality of work tools.

Another aspect of the present disclosure provides a machine configured to utilize a plurality of work tools. The machine has an engine configured to operate at a plurality of engine speeds. The machine includes a controller operatively coupled to the engine of the machine. The controller is configured to transition the machine from a first operating configuration to a second operating configuration when the machine transitions from a first of the plurality of work tools to a second of the plurality of work tools. The first operating configuration produces a plurality of first outputs at a plurality of engine speeds, and the second operating configuration produces a plurality of second outputs at the plurality of engine speeds. At least one of the first outputs is different from at least one of the second outputs.

Another aspect of the present disclosure provides a method for controlling a machine comprising the steps of decoupling a first work tool from the machine. The first work tool has a first operating configuration. The method further includes after decoupling the first work tool, coupling a second work tool to the machine. The method further includes after coupling the second work tool, selecting a second operating configuration based on the second work tool, whereby the second operating configuration is different from the first operating configuration.

DETAILED DESCRIPTION

The disclosure relates generally to a work machine configured to utilize a plurality of work tools. The work tools may be interchanged with the work machine and coupled thereto in order to perform a variety of tasks. After each tool is interchanged, an engine operating configuration may be selected based on the work tool and/or the work application to be performed. After selection of the operating configuration, an operator of the work machine may perform the intended application.

Figure 1:
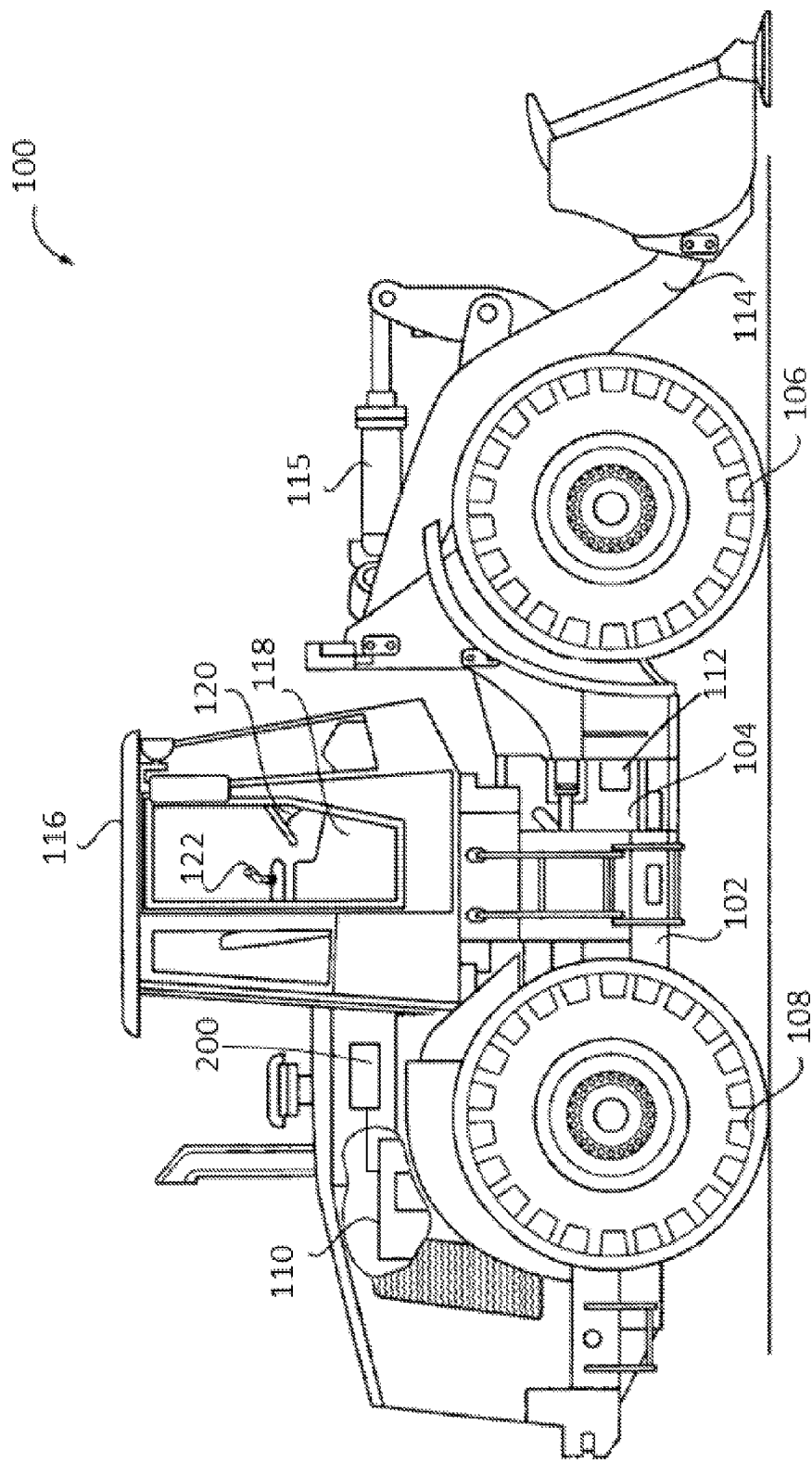
FIG. 1 is a side view of a machine, according to an aspect of this disclosure.

FIG. 1 illustrates a machine 100, according to one aspect of the disclosure. The machine 100 may be a wheel loader, as shown, or any other on-highway or off-highway vehicle used to perform work operations. In the illustrated aspect, machine 100 includes a machine body 102 having a drive system 104 supported thereon for driving the front wheels 106 and rear wheels 108 of the machine 100. The drive system 104 may receive power from an internal combustion engine 110, or other power source, and transmit the power to one or more ground engaging elements, such as the front wheels 106, the rear wheels 108, or both. The drive system 104 may also include a variator 112, and/or any other known components, such as, for example, a torque converter, final drive assembly, or the like. It will be appreciated that a variety of drive systems may be used for propelling the machine 100.

The engine 110 may also be configured to provide power for one or more work tools 114 coupled to the machine body 102 of the machine 100. One or more hydraulic cylinders 115 may be coupled to the machine body 102 to control movement of the work tools 114. In general, work tools 114 may be divided into two categories: single application tools, which are capable of performing a single application, and multi-application tools, which capable of performing more than one application. Single-application work tools 114 may include, but are not limited to, trenching tools, material handling arms, augers, brooms, rakes, stump grinders, snow blowers, wheel saws, tire loaders, and asphalt cutters. Multi-application tools 114 may include, but are not limited to, buckets, angle blades, cold planers, compactors, forks, landscape rakes, grapples, backhoes, hoppers, truss booms, and thumbs. It will be appreciated that the work tool 114 attached to the work machine 100 may either be a single-application tool or a multi-application tool. Work applications capable of being performed by the work tool 114 coupled to the machine body 102 may include, but are not limited to, stockpiling, trenching, hammering, digging, raking, grading, moving pallets, material handling, snow removal, tilling soil, demolition work, carrying, cutting backfilling, and sweeping.

It will be appreciated that the one or more work tools 114 may include active work tools and passive work tools. Active work tools are work tools that are coupled to the machine 100, and passive work tools are work tools that are not coupled to the machine 100, but may be interchanged with the active work tool and coupled to the machine 100.

The variator 112 may be configured to allow the engine 110 to adjust from one engine speed to another. In an aspect of this disclosure, the variator 112 may be a continuously variable transmission (CVT). In a further aspect, the variator 112 may be a hydrostatic transmission. The variator 112 may produce an output which may be transmitted through a mechanical transmission (not shown) to adjust an output of the machine 100.

The variator 112 may include gear shifting points that may vary based on the work application being performed by the machine 100 and the type of work tool 114 coupled to the machine 100. The gear shifting points may be associated with a speed of the engine 110 and a corresponding gear at which the machine 100 is operating, such that when the speed of the engine reaches the gear shifting point, the machine 100 may transition from one gear to a next gear.

An operator control station 116 may be mounted to the machine body 102 from which an operator may control and direct operation of the machine 100. The control station 116 may include devices such as a seat assembly 118, a steering device 120, and an engine speed selection device 122 for selecting an engine speed of the engine 110.

To facilitate control and coordination of the machine 100, the machine 100 may include a control system 200, which may be used to facilitate control and coordination of any methods or procedures described herein. Components of the control system 200 may be housed in the operator control station 116, on the machine 100, located remotely, or any combination thereof.

Figure 2:
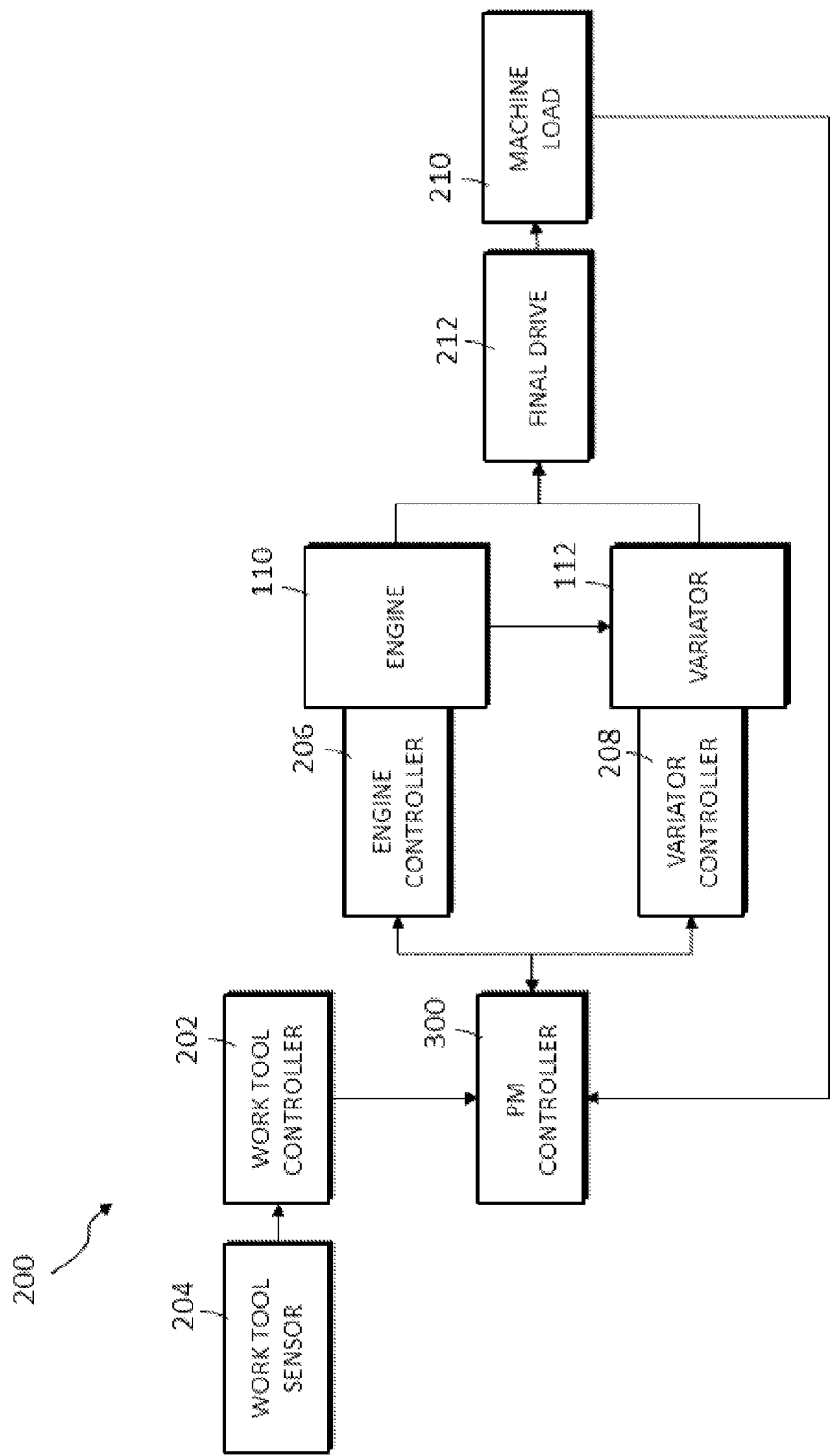
FIG. 2 is a block diagram of a control system, according to an aspect of this disclosure.

FIG. 2 illustrates a block diagram of the control system 200, according to an aspect of this disclosure. The control system 200 may be configured to control the output of the engine 110, the variator 112, and/or other components of the machine 100. The control system 200 may include one or more sensors, such as at least one work tool sensor 204, and one or more controllers, such as a work tool controller 202, a productivity management (PM) controller 300, an engine controller 206, and a variator controller 208.

The one or more controllers 202, 206, 208, 300 may include, for example, electronic controllers, system computers, central processing units, or other data storage and manipulation devices known in the art. Each of the controllers 202, 206, 208, 300 may be a single unit or may be distributed as a plurality of distinct but interoperating units. In other aspects, each of the controllers 202, 206, 208, 300 may be incorporated into another component or located at different locations on or off the machine 100.

Referring to FIGS. 1 and 2, the work tool controller 202 may be operatively coupled to the PM controller 300 and to at least one work tool sensor 204. The work tool controller 202 may be configured to identify the work tool 114 coupled to the machine 100, identify the work application being performed by the machine 100, or both. The at least one work tool sensor 204 may be configured to sense work tool parameters, such as, hydraulic pressure, hydraulic flow, work tool position, or other data used to determine the active work tool and/or the work application being performed by the machine 100. The at least one work tool sensor 204 may be located on either or both of the machine 100 and work tool 114 and may be configured to transmit sensed data to the work tool controller 202 at start-up of the machine 100 or during operation of the machine 100. The machine 100 may continue to operate even while the work tool controller 202 attempts to identify the work tool 114 coupled to the machine 100 and/or the work application of the machine 100. Once the identity of the work tool 114 and/or work application is determined, the information may be provided to the PM controller 300. In an aspect of this disclosure, the work tool controller 202 may be a hydraulic controller.

The engine controller 206 and the variator controller 208 may be operatively coupled to the engine 110 and the variator 112, respectively, and each of the engine controller 206 and the variator controller 208 may further be operatively coupled to the PM controller 300. The engine controller 206 and the variator controller 208 may each receive operating commands from the PM controller 300 to control the operation of the engine 110 and the variator 112, respectively.

The PM controller 300 may be operatively coupled to the engine 110, the variator 112, and/or a fuel system (not shown) by the engine controller 206, the variator controller 208, or a fuel system controller (not shown), respectively. In an aspect, the PM controller 300 may be directly coupled to the engine 110, the variator 112, and/or the fuel system. The coupling between the PM controller 300 and the engine 110, the variator 112, and/or the fuel system may be through either wired or wireless communication systems.

The PM controller 300 may be configured to identify and select an engine operating configuration, identify and select an engine speed set point, control the engine 110 to operate at the selected engine operating configuration, and control the variator 112 to set the engine speed to the selected engine speed set point based on the work application being performed by the machine 100, the work tool 114 coupled to the machine 100, the machine load 210, power train information, fuel use, work load, other machine operating parameters, or any combination thereof. In an aspect of this disclosure, the PM controller 300 may be further configured to determine the work application being performed by the machine 100 or the work tool 114 being used by the machine 100. As used herein, the term "engine operating configuration" refers to a set of electronic control parameters that are determined during an engine calibration process to allow the engine to meet both machine performance requirements and emission regulations. The set of control parameters may include an injection timing, an injection pressure, an injection mode, a fuel quantity, an exhaust gas recirculation level, or others depending on a type of application.

Figure 3:
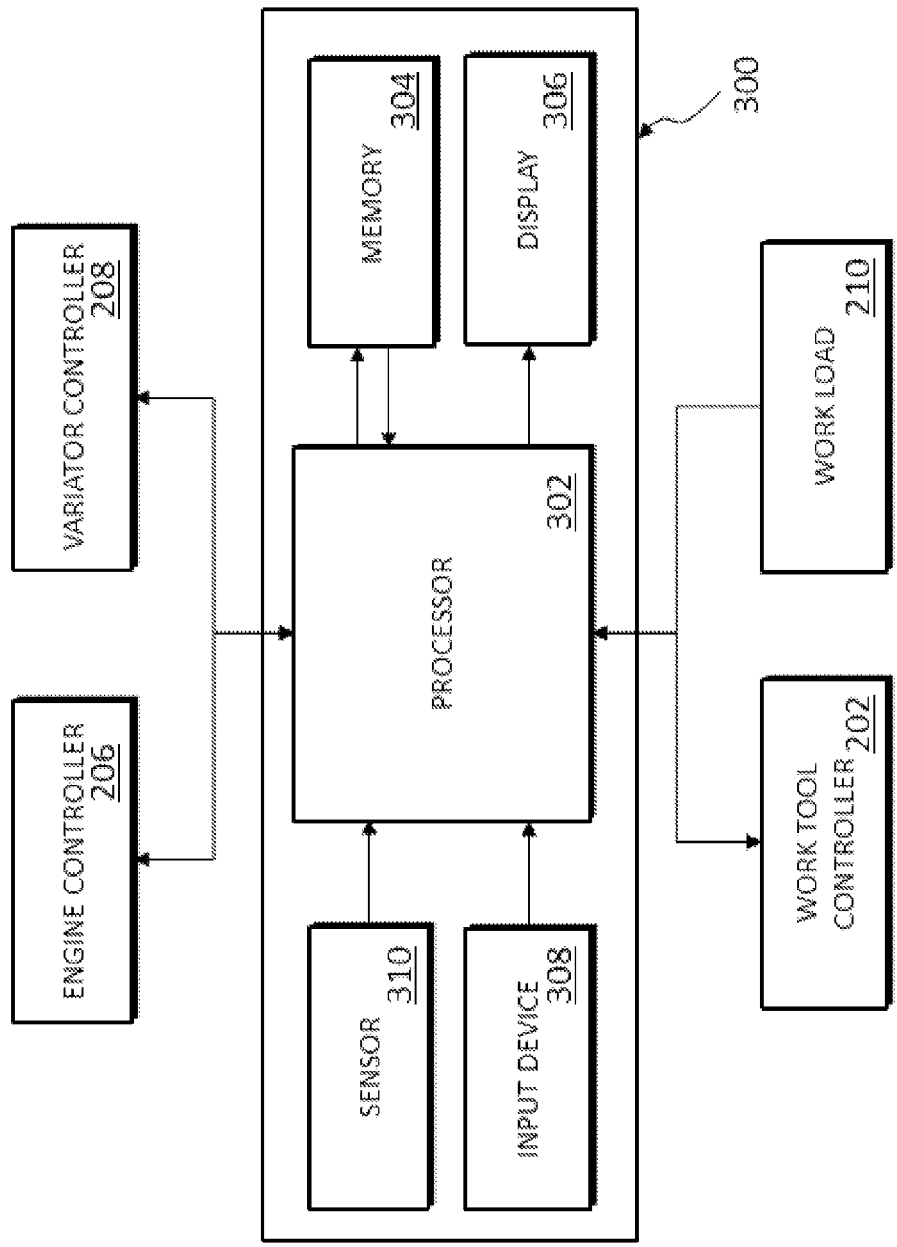
FIG. 3 is a block diagram of a controller, according to an aspect of this disclosure.

The PM controller 300 is configured to facilitate control and coordination of the machine 100. Referring to FIG. 3, the PM controller 300 may include a processor 302, a memory 304, a display or output 306, an input device 308, at least one sensor 310, or combinations thereof. The main unit of the PM controller 300 may be located in the operator control station 116 for access by the operator and may communicate with the steering device 120, a power system, the work tool controller 202, the engine controller 206, the variator controller 208, and with various other sensors and controls on the machine 100.

The processor 302 may be coupled to the memory 304, the input device 308, the at least one sensor 310, the work tool controller 202, the engine controller 206, and the variator controller 208 for receiving input. The processor 302 may be configured to output signals that are responsive to these inputs, as further described herein. A display 306 may also be coupled to the processor 302 and may be positioned in the operator control station 116 to display various data to an operator relating to the machine position, the work application, the work tool being used, or other parameters. Action may be taken in response to the data displayed including commencing the machine operation within a work area, stopping travel of the machine 100, modifying the speed of the machine 100, or redirecting or otherwise changing a planned travel path or work pattern. Examples of processors include computing devices and/or dedicated hardware as defined herein, but are not limited to, one or more central processing units and microprocessors.

The at least one sensor 310 may include a signal transducer configured to sense a transmitted signal, or component of a transmitted signal, for example, a signal indicating a change of work tools 114, a change in a work application, or combinations thereof. The at least one sensor 310 may further indicate the amount of power used by the engine 110, the engine speed, the engine output, or other information for use in controlling the engine 110 and/or variator 112.

The signals received by the processor 302 from the at least one sensor 310, input device 308, work tool controller 202, engine controller 206, and variator controller 208 may be stored as values in the computer readable memory 304, and used to identify and select an engine operating configuration and engine speed set point using algorithms stored in the memory 304. The processor 302 may identify and select the engine operating configuration and engine speed set point from engine calibration maps and variator calibration maps, respectively. Both the engine calibration maps and the variator calibration maps may be predetermined during an engine calibration process and stored as reference tables in memory 304. In an aspect of this disclosure, the predetermined values may be adjusted by an operator through the input device 308, or by other means, to enable adaptive calibration capability. According to another aspect of this disclosure, the processor 302 may be configured to calculate an engine operating configuration and engine speed set point based on the received signals and simulation models.

The engine operating configuration and engine speed set point identified and selected by the processor 302 may be sent as an output signal to the engine controller 206 and the variator controller 208 to set the engine operating configuration and engine speed set point of the engine 110 and the variator 112, respectively. The processor 302 may also send a signal to the display 306 to communicate the present engine operating configuration and engine speed set point being applied by the engine controller 206 and variator controller 208. Selecting the engine operating configuration and engine speed set point may be repeated continuously until the machine operation is complete.

The computer readable memory 304 may include random access memory (RAM), read-only memory (ROM), or both. The memory 304 may store a plurality of operating configurations, a plurality of engine speed set points, or other data that may be used to control engine 110. The memory 304 may also store computer executable code including a control algorithm for identifying and selecting an engine operating configuration and an engine speed set point to apply to the engine 110 and the variator 112 responsive to inputs from the at least one sensor 310, input device 308, work tool controller 202, engine controller 206, and variator controller 208. The memory 304 may also store various digital data, which may be provided to the processor 302 when identifying and selecting an engine operating configuration and engine speed set point.

The display 306 may be located on the machine 100, remotely from the machine 100, or combinations thereof, and may include, but is not limited to, cathode ray tubes (CRT), light-emitting diode display (LED), liquid crystal display (LCD), organic light-emitting diode display (OLED), or a plasma display panel (PDP). Such displays can also be touchscreens and may incorporate aspects of the input device 308. The display 306 may also include a transceiver that communicates over a communication channel.

Prior to operation of the machine 100, the engine 110 may be configured with an initial engine operating configuration and the variator 112 may be set with an initial engine speed set point. The initial engine operating configuration and the initial engine speed set point may be predetermined by the engine calibration maps and variator calibration maps, respectively. The initial engine operating configuration may include predetermined calibration maps to generate an engine torque output and engine tailpipe emissions corresponding to a plurality of engine speeds, such that at each engine speed the engine 110 produces an engine torque output and emissions that satisfy application torque demands and emission regulations, respectively.

The initial engine speed set point is the initial output speed of the engine 110 as controlled by the variator 112. The variator 112 allows the engine 110 to run at a plurality of predetermined discrete speeds. Further, the variator 112 may be capable of providing a desired output torque at any predetermined discrete engine speed by continuously changing a ratio of the transmission system.

Figure 4:
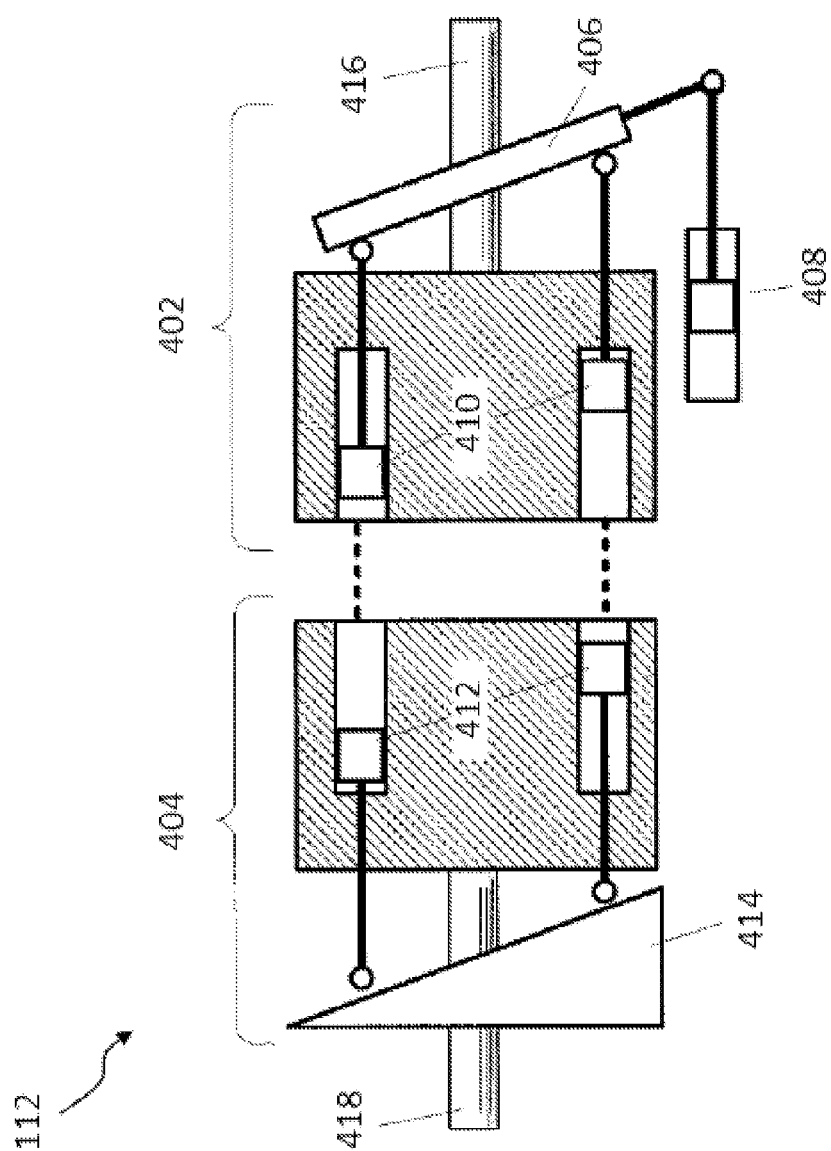
FIG. 4 is a schematic of a variator, according to an aspect of this disclosure.

FIG. 4 illustrates a schematic of the variator 112, according to an aspect of this disclosure. The variator 112 includes a hydraulic pump 402 and a hydraulic motor 404. The hydraulic pump 402 includes a variable swash plate 406, a swash plate actuator 408, and a plurality of pump pistons 410. The swash plate actuator 408 may be configured to actuate the variable swash plate 406, which changes the position of the swash plate 406 from a first angle to a second angle. The plurality of pump pistons 410 may be in sliding contact with the variable swash plate 406, such that a change in angle of the variable swash plate 406 can determine the displacement of the hydraulic pump 402.

The hydraulic motor 404 includes a plurality of motor pistons 412 and a fixed swash plate 414. The plurality of motor pistons 412 may be slideably engaged upon the fixed swash plate 414. Referring to FIGS. 2 and 4, an input shaft 416 of the variator 112 may be operatively coupled to the engine 110, and the output shaft 418 of the variator 112 may be operatively coupled to the machine final drive 212. An external load applied to the variator 112 may be applied to the engine 110 by adjusting the position of the variable swash plate 406. In some cases, the load from the variator 112 to the engine 110 may cause the engine 110 to stall or lug at one of the predetermined engine speeds. In order to avoid this situation, the variator 112 can reset the engine speed according to the variator calibration maps stored in memory 304. According to an aspect of this disclosure, the initial engine speed set point is independent of the initial engine operating configuration. According to another aspect, the initial engine speed set point is dependent upon the initial engine operating configuration.

The initial engine operating configuration may depend on the type of work tool 114 coupled to the machine 100. For example, different work tools 114 may operate at different hydraulic operating pressures and flow rates, and therefore demand more or less power from the engine 110. Further, movement of the machine 100 may also require more or less power from the engine 110 based on the size, weight, and/or other physical properties of the work tool 114 coupled to the machine 100. The determination of what type of work tool 114 is coupled to the machine 100 may be made by the machine operator, the work tool controller 202, or the PM controller 300. Based on the type of work tool 114 coupled to the machine 100, the PM controller 300 may identify and select an initial engine operating configuration based on predetermined values stored in memory 304.

Alternatively, the initial engine operating configuration may depend on the type of work tool 114 coupled to the machine 100 and the work application being performed by the machine 100. If the work application to be performed has been determined prior to operation, then this information may be provided to the PM controller 300 in order to identify and select an initial engine operating configuration based on predetermined values stored in memory 304.

The predetermined values stored in memory 304 may include data representative of the engine operating parameters and calibration parameters, such as, for example, engine torque output profiles, engine power output profiles, engine work profiles, engine speed profiles, engine fuel profiles, and injection timing tables. Each engine operating configuration may include a set of engine operating parameters correlated to one another by a series of data points. For example, each engine speed profile may have a corresponding engine output profile and an engine fuel profile. Therefore, when the engine 110 is controlled to operate at an engine operating configuration, the engine 110 may produce a certain output based on the engine speed and/or fuel input to the engine 110, while the engine 110 is controlled to satisfy emission regulations.

Each of the operating parameters may also be correlated to a work tool 114 and/or a work application. For example, each type of work tool 114 may have a corresponding engine operating configuration and/or engine speed set point stored in memory 304. After the identification of the type of work tool 114 coupled to the machine 100 is determined, an engine operating configuration and/or engine speed set point corresponding to that work tool 114 may be identified and selected by the PM controller 300. The selected engine operating configuration may be transmitted by the PM controller 300 to the engine controller 206 to control the engine 110, and the selected engine speed set point may be transmitted by the PM controller 300 to the variator controller 208 to control the variator 112. The engine 110 and the variator 112 may then operate at the selected engine operating configuration and engine speed set point, respectively.

In another example, each type of work tool 114 may have a corresponding work application or plurality of work applications. Depending on how the work tool 114 is going to be applied may determine which engine operating configuration and/or engine speed set point is selected. After the work tool 114 and the work application have been identified, for example by the PM controller 300, the corresponding engine operating configuration and/or engine speed set point are transmitted to the engine controller 206 and variator controller 208, respectively, to control the machine 100.

Figure 6:
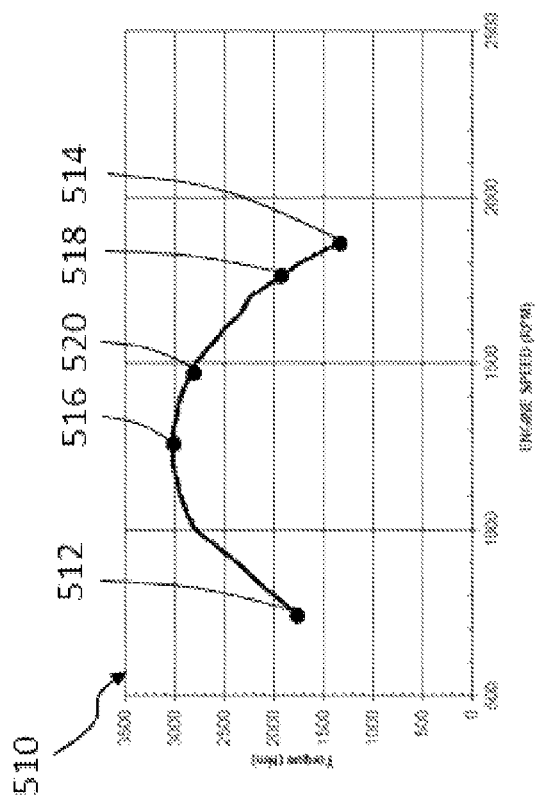
FIG. 6 is a second graph depicting engine torque and engine speed, according to an aspect of this disclosure.
Figure 5:
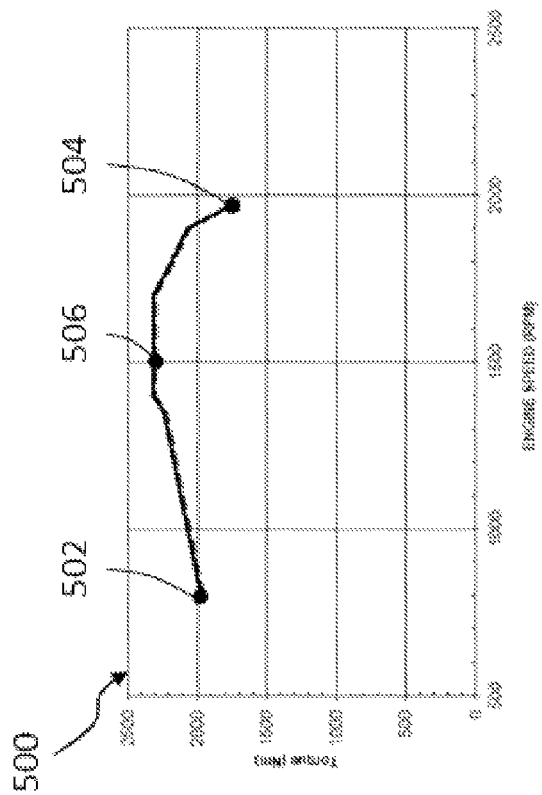
FIG. 5 is a first graph depicting engine torque and engine speed, according to an aspect of this disclosure.

In an aspect of this disclosure, the processor 302 may be configured to select the initial engine operating configuration and/or initial engine speed set point based on a torque rise. Referring to FIGS. 5 and 6, the torque rise is the rise in engine output torque from an engine output torque at a maximum or set point engine speed to an engine output torque at an intermediate engine speed. The intermediate engine speed may be the engine speed at which a peak engine output torque is produced. FIGS. 5 and 6 each illustrate a correlation between the engine output torque and the engine speed. FIG. 5 depicts an example of a first engine operating configuration 500. The engine speed profile ranges from a first minimum speed value 502, for example about 800 revolutions per minute (RPM), to a first maximum speed value 504, for example about 1,950 RPM. The engine torque output profile ranges from about 1,750 Nm, at a first minimum torque value 504, to about 2,300 Nm, at the first maximum torque value 506. The maximum torque rise for the first engine operating configuration 500 is approximately 550 Nm, which results in a torque rise of about 30% (e.g. 550 Nm/1,750 Nm).

FIG. 6 depicts an example of a second engine operating configuration 510. The engine speed profile ranges from a second minimum speed value 512, for example about 750 RPM, to a second maximum speed value 514, for example about 1,900 RPM. The engine torque output profile ranges from about 1,300 Nm, at a second minimum torque value 514, to about 3,000 Nm, at a second maximum torque value 516. The maximum torque rise for the second engine operating configuration 510 is approximately 1,700 Nm, which results in a torque rise of about 130% (e.g. 1,700 Nm/1,300 Nm).

In an aspect of this disclosure, the plurality of speeds and the torque output for the first engine operating configuration 500 and the second engine operating configuration 510 may be different. For example, the first minimum speed value 502 of the first engine operating configuration 500 may be different from the second minimum speed value 512 of the second engine operating configuration 510 and the first maximum torque value 506 of the first engine operating configuration 500 may be different from the second maximum torque value 516 of the second engine operating configuration 510. Further, the engine speed correlating to the maximum torque value may be different for the first engine operating configuration 500 and the second engine operating configuration 510. For example, in the first engine operating configuration 500 the first maximum torque value 506 is reached at an engine speed of approximately 1,500 RPM, whereas in the second engine configuration 510 the second maximum torque value 516 is reached at an engine speed of approximately 1,250 RPM. Still further, the torque output correlating to an engine speed for the first engine operating configuration 500 and the torque output correlating to the same engine speed for the second engine operating configuration 510 may be different. For example, the torque output at engine speed 1,500 RPM for the first engine operating configuration 500 is approximately 2,300 NM, and the torque output at engine speed 1,500 RPM for the second engine operating configuration 510 is approximately 3,000 RPM.

Selecting the initial engine operating configuration and/or the initial engine speed set point based on the torque rise may depend on the work tool 114 and/or the work application. For example, if the work tool 114 coupled to the machine 100 is configured for use in a high torque application, such as a wheel loader being applied to doze a mound of earth, then a higher torque profile having a higher torque rise may be selected, such as the second engine operating configuration 510. If the work tool 114 coupled to the machine 100 is configured for use in a low torque application, such as a fork being applied to move logs or a tree in a work site, then a lower torque profile having a lower torque rise may be selected, such as the first engine operating configuration 500. Further, the initial engine speed set point may be selected based on the selected engine operating configuration. For example, if the second engine operating configuration 510 has been selected because it has a high torque rise, then the initial engine speed set point may be set at an intermediate speed value 518 close to or at the second maximum speed value 514. If the initial engine speed set point were set to a lower speed, such as at point 520, then the benefit of the high torque rise of the second engine operating configuration 510 may be minimized and result in underperformance or stalling of the engine 110.

INDUSTRIAL APPLICABILITY

The present disclosure provides a system and method for transitioning an engine 110 of a work machine 100 from a first engine operating configuration to a second engine operating configuration when the machine 100 transitions from an active work tool to one of the plurality of passive work tools. The machine 100 includes a PM controller 300 that uses information identifying the work tool 114 and/or the intended work application of the machine 100, along with engine operating parameters stored in memory 304, to identify and select the engine operating configuration to apply to the engine 110.

Referring to FIGS. 1 to 6, according to one aspect of this disclosure, the torque rise may be predetermined and stored in memory 304. Each predetermined torque rise may correspond to a work tool 114 and/or work application, such that when the work tool 114 and/or work application has been determined, the engine operating configuration and/or engine speed set point may be selected based on the predetermined torque rise.

In alternative aspects of this disclosure, selecting the initial engine operating configuration and/or the initial engine speed set point may also be based on a minimum torque required to perform a work application, maximizing fuel efficiency, or other factors that may impact the machine 100 performance. For example, if a high engine torque output with a moderate torque rise (e.g. 30-35%) is needed to perform a work application and the second engine operating configuration 510 has been selected, the engine speed set point may be selected to meet the engine torque output requirements while maximizing fuel efficiency. In this example, the selected engine speed set point may be lower than the intermediate speed value 518 that is closer to the second maximum speed value 514 because the engine torque output requirements may be met by using a lower engine speed. The lower engine speed may reduce fuel use, and therefore increase fuel efficiency.

After the initial engine operating configuration and the initial engine speed set point have been selected, the machine 100 may perform the intended work application. During the operation of the machine 100, the PM controller 300 or machine operator may modify the initial engine operating configuration and/or engine speed set point based on information related to the machine load 210. For example, if the machine load 210 exceeds a predetermined engine torque threshold, the PM controller 300 or machine operator may be notified so that a new engine operating configuration having a higher engine torque output may be identified and selected. It will be appreciated that a predetermined engine torque threshold may be stored in memory 304 and correlated with each engine operating configuration.

A machine operator may transition between work tools 114, such that the active work tool may be de-coupled from the machine 100 and one of the plurality of passive work tools may be coupled to the machine 100. In response, the PM controller 300 or machine operator may transition the engine 110 from operating at a first engine operating configuration corresponding to the active work tool, to a second engine operating configuration corresponding to the passive work tool. After transition, the passive work tool becomes the current active work tool.

The change in work tools may be sensed by the at least one work tool sensor 204 and transmitted to the work tool controller 202, along with other work tool parameters as described above. Based on the information provided by the at least one work tool sensor 204, the work tool controller 202 may identify the current work tool. After the identity of the current work tool is determined, the information may be provided to the PM controller 300.

The PM controller 300 may select a second engine operating configuration based on the current work took, a torque rise, a minimum torque required to operate the second work tool, the fuel efficiency of the engine 110, or other factors that may impact the machine 100 performance, as discussed above. Further, if the work application intended to be performed by the machine 100 is known, then this may also be considered by the PM controller 300 when identifying and selecting the second engine operating configuration. In an aspect of this disclosure, the PM controller 300 may automatically identify and select the second engine operating configuration after the passive work tool has been coupled to the machine 100.

In an aspect of this disclosure, gear shifting points of the parallel path continuous variable transmission that has the variator 112 may be stored in memory 304 and correlated to the engine operating configurations. Therefore, when an engine operating configuration is identified and selected, the corresponding gear shifting points may be adjusted by the PM controller 300 and/or variator controller 208.

The PM controller 300 facilitates operator control of the machine 100 after transitioning between the active work tool and the passive work tool. When work tools 114 are interchanged, a different work application is typically performed by the same machine 100. Moreover, each work tool 114 may require more or less power from the engine 110 based on the size, weight, and/or other physical properties of the work tool 114. By accounting for the differences between each work tool 114 and each work application, the potential for underperformance and stalling of the engine 110 is minimized.

It will be appreciated that the foregoing description provides examples of the disclosed system and method. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

We claim:

1. A machine configured to utilize a plurality of work tools comprising:
    an engine configured to operate at a plurality of engine speeds,
        the engine having a first configuration in which the engine produces a first output when the engine operates at one of the plurality of engine speeds,
        the engine further having a second configuration in which the engine produces a second output when the engine operates at the one of plurality of engine speeds,
        wherein the first output is different from the second output; and
    a controller operatively coupled to the engine, the controller being configured to:
        select the first configuration based on a torque rise of the engine corresponding to a work application of a first work tool of the plurality of work tools or based on a minimum torque required to perform of the work application of the first work tool,
        select the second configuration based on a torque rise of the engine corresponding to a work application of a second work tool of the plurality of work tools or based on a minimum torque required to perform of the work application of the second work tool, and
        transition the engine from the first configuration to the second configuration when the machine transitions from the first work tool of the plurality of work tools to the second work tool of the plurality of work tools.

2. The machine of claim 1, wherein the first output is a first torque output by the engine, and wherein the second output is a second torque output by the engine.

3. The machine of claim 1, wherein the controller is further configured to store a plurality of predetermined output profiles, wherein each of the plurality of predetermined output profiles includes a series of data points that correlate an output produced by the engine to the plurality of engine speeds, wherein a first profile of the plurality of predetermined output profiles corresponds to the first configuration, and wherein a second profile of the plurality of predetermined output profiles corresponds to the second configuration.

4. The machine of claim 1, further comprising a continuously variable transmission operatively coupled to the controller, wherein the continuously variable transmission is configured to set an engine speed of the engine.

5. The machine of claim 4, wherein the controller is further configured to control the continuously variable transmission to set a first engine speed of the engine based on the first configuration, and further configured to set a second engine speed of the engine based on the second configuration.

6. The machine of claim 1, wherein the controller is further configured to select the first configuration based or select the second configuration based on maximizing fuel efficiency.

7. The machine of claim 6, wherein the controller selects the first configuration or selects the second configuration based on factors that influence performance of the machine.

8. The machine of claim 1, further comprising a second controller operatively coupled to the machine, the second controller configured to determine the work application of the first work tool, and further configured to determine the work application of the second work tool.

9. The machine of claim 8, wherein the second controller is a hydraulic controller.

10. A machine configured to utilize a plurality of work tools, the machine having an engine configured to operate at a plurality of engine speeds, the machine comprising:
    a controller operatively coupled to the engine of the machine, the controller being configured to:
        select a first operating configuration based on a torque rise of the engine corresponding to a work application of a first work tool of the plurality of work tools or based on a minimum torque required to perform of the work application of the first work tool,
        select a second operating configuration based on a torque rise of the engine corresponding to a work application of a second work tool of the plurality of work tools or based on a minimum torque required to perform of the work application of the second work tool,
        transition the machine from the first operating configuration to the second operating configuration when the machine transitions from the first work tool to the second work tool,
        wherein the first operating configuration produces a plurality of first outputs at a plurality of engine speeds,
        wherein the second operating configuration produces a plurality of second outputs at the plurality of engine speeds, and
        wherein one of the plurality of first outputs at one of the plurality of engine speeds is different from one of the plurality of second outputs at the one of the plurality of engine speeds.

11. The machine of claim 10, wherein the plurality of first outputs is a first torque output by the machine, and wherein the plurality of second outputs is a second torque output by the machine.

12. The machine of claim 10, wherein the first operating configuration and the second operating configuration include a relationship between an engine speed and a torque output by the machine.

13. The machine of claim 10, wherein the controller is further configured to select the first operating configuration or select the second operating configuration based on maximizing fuel efficiency.

14. The machine of claim 10, wherein the controller selects the first operating configuration or selects the second configuration based on factors that influence performance of the machine.

15. A method of configuring an engine of a machine, the engine configured to operate at a plurality of engine speeds, the method comprising the steps of:
    coupling a first work tool to the machine;
    after the coupling step, identifying the first work tool coupled to the machine;
    after identifying the first work tool, selecting a first operating configuration from a plurality of operating configurations of the engine,
        the first operating configuration including a first engine output that corresponds to a first speed of the plurality of engine speeds,
        the first operating configuration being selected based on a torque rise of the engine corresponding to a work application of the first work tool or based on a minimum torque required to perform of the work application of the first work tool;

after selecting the first operating configuration, transitioning the engine from a second operating configuration including a second engine output,
the second engine output corresponding to the first engine speed of the plurality of engine speeds, and
the second engine output being different than the first engine output to the first operating configuration,
the second operating configuration being selected based on a torque rise of the engine corresponding to a work application of a second work tool or based on a minimum torque required to perform of the work application of the second work tool.

16. The method of claim 15, further comprising the step of:
de-coupling a third work tool from the machine prior to coupling the first work tool to the machine.

17. The method of claim 15, further comprising the step of:
operating the machine at the second operating configuration.

18. The method of claim 15, wherein selecting the first operating configuration comprises selecting the work application of the first work tool.

19. The method of claim 18, wherein selecting the work application of the first work tool is performed by an operator of the machine.

20. The method of claim 15, wherein the first engine output is a first torque output of the engine, and wherein the second engine output is a second torque output of the engine.

* * * * *